US007549922B2

(12) United States Patent
Falvey et al.

(10) Patent No.: US 7,549,922 B2
(45) Date of Patent: Jun. 23, 2009

(54) SOFTWARE SECURITY FOR GAMING DEVICES

(75) Inventors: Grahame M. Falvey, Graz (AT); Christian Koller, Graz (AT); Gregor Kopesky, Graz (AT); Gerhard Tüchler, Graz (AT)

(73) Assignee: Atronic International GmbH, Lübbecke (DE)

( * ) Notice: Subject to any disclaimer, the term of this patent is extended or adjusted under 35 U.S.C. 154(b) by 390 days.

(21) Appl. No.: 11/083,706

(22) Filed: Mar. 17, 2005

(65) Prior Publication Data

US 2006/0211491 A1 Sep. 21, 2006

(51) Int. Cl.

| | |
|---|---|
| ***A63F 9/24*** | (2006.01) |
| ***H04L 9/00*** | (2006.01) |
| ***G06F 12/14*** | (2006.01) |
| ***G06F 17/00*** | (2006.01) |

(52) U.S. Cl. ......................... 463/29; 713/187; 713/176; 380/251

(58) Field of Classification Search ................... 463/25, 463/29, 42

See application file for complete search history.

(56) References Cited

U.S. PATENT DOCUMENTS

| | | | | |
|---|---|---|---|---|
| 5,812,662 | A * | 9/1998 | Hsu et al. | 705/55 |
| 6,067,621 | A * | 5/2000 | Yu et al. | 713/172 |
| 6,577,733 | B1 * | 6/2003 | Charrin | 380/251 |
| 7,043,641 | B1 * | 5/2006 | Martinek et al. | 713/187 |
| 7,116,782 | B2 * | 10/2006 | Jackson et al. | 380/251 |
| 7,203,841 | B2 * | 4/2007 | Jackson et al. | 713/187 |
| 2004/0198494 | A1 * | 10/2004 | Nguyen et al. | 463/42 |
| 2006/0048236 | A1 * | 3/2006 | Multerer et al. | 726/28 |

* cited by examiner

*Primary Examiner*—Corbett B Coburn
*Assistant Examiner*—Manjot K Dhillon
(74) *Attorney, Agent, or Firm*—Patent Law Group LLP; Brian D. Ogonowsky

(57) ABSTRACT

A secure smart card or other secure modular memory device is plugged into (or otherwise connected to) a port of a game controller board internal to a gaming machine. The smart card is programmed to detect an encrypted "challenge" message from the host CPU and output an encrypted "response." If the host CPU determines that the response has the expected properties, then the host CPU verifies that the game program is authentic (i.e., the game program is accurate and authorized for use by that particular gaming machine and customer), and the game can be played. The challenge/request exchange may be performed before every game is played on the machine or at any other time. If the response is improper, then the host CPU will issue a halt command to halt play of the game. By controlling access to the properly programmed smart card, gaming machines cannot run unauthorized copies of the game program. Various other security features are disclosed for protecting communications and data within the gaming machine, such as erasing secure memories if tampering is detected and requiring that an authorized secure smart card be connected to each one of multiple game boards in a single gaming machine for accurate secure communications between boards.

14 Claims, 10 Drawing Sheets

Security Architecture for a Single Board EGM

Different Partitions of the Mass Storage Device

Protocol Stack Enhanced Layer Protocol

Key Exchange Protocol

Close Up of Secure Area on Board

SOFTWARE SECURITY FOR GAMING DEVICES

FIELD OF THE INVENTION

This invention relates to gaming devices, such as slot machines, and in particular to techniques to ensure the authenticity of the gaming software used in such devices.

BACKGROUND

Modem gaming machines, such as slot machines, are software controlled. For example, the final symbols displayed by motor driven reels are predetermined using a programmed microprocessor. Video gaming machines are totally controlled by a processor running a game program. As the games become more complex, such as incorporating special bonus games, the software becomes more complex and more expensive to develop.

It is important to implement security provisions to prevent copying of the game program and prevent unauthorized changes to the game program.

In some cases, an unscrupulous competitor may obtain a gaming machine and copy the object code using sophisticated reverse engineering techniques. The copied code may then be loaded into a generic platform gaming machine, which is then sold in various countries that offer little enforcement of copyrights. In other cases, the code may be illegally changed to alter the chances of winning.

Accordingly, what is needed is an ultra-high security technique that prevents a legitimate gaming application from being illegally changed or illegally copied and used in an unauthorized machine. Also what is needed is a technique that prevents any access to secret software in the gaming machine.

SUMMARY

In one embodiment of the invention, a secure smart card or other secure modular memory device is plugged into (or otherwise connected to) a port of a game controller board internal to a gaming machine. The game controller board contains the main CPU, memory, and other circuitry for operating the gaming machine. The game program may be stored in a mass storage device, such as a CD ROM/reader, hard disc, or flash device, and connected to the game controller board via an I/O port. The plug-in module will be referred to herein as a dongle. The dongle is programmed to detect an encrypted "challenge" message from the host CPU and output an encrypted dongle "response." If the host CPU determines that the response has the expected properties, then the host CPU verifies that the game program is authentic (i.e., the game program is accurate and authorized for use by that particular gaming machine and customer), and the game can be played. The challenge/response exchange may be performed before every game is played on the machine or at any other time.

If the dongle response is improper, then the host CPU will issue a halt command to halt play of the game.

The dongle is designed in such a way that its software cannot be copied. Existing smart card designs, standards, and encryption provide sufficient security. Since the smart card software cannot be copied, and encryption is used, there is no way to determine the proper dongle response to a particular challenge by the host CPU. So, even if the game application were successfully copied, without the associated secure dongle the game could not be performed.

Methods for handling (e.g., distributing and allocating) the dongles are also described to allow the manufacturer to control the post-sale uses of the gaming machines.

In a further step to achieve added security, the game controller board has a secure area, where any attempt to gain access to the circuitry results in the software being erased. Other security features are also disclosed, such as requiring that an authorized secure smart card be connected to each one of multiple game boards in a single gaming machine for accurate secure communications between boards.

DETAILED DESCRIPTION

Figure 1:
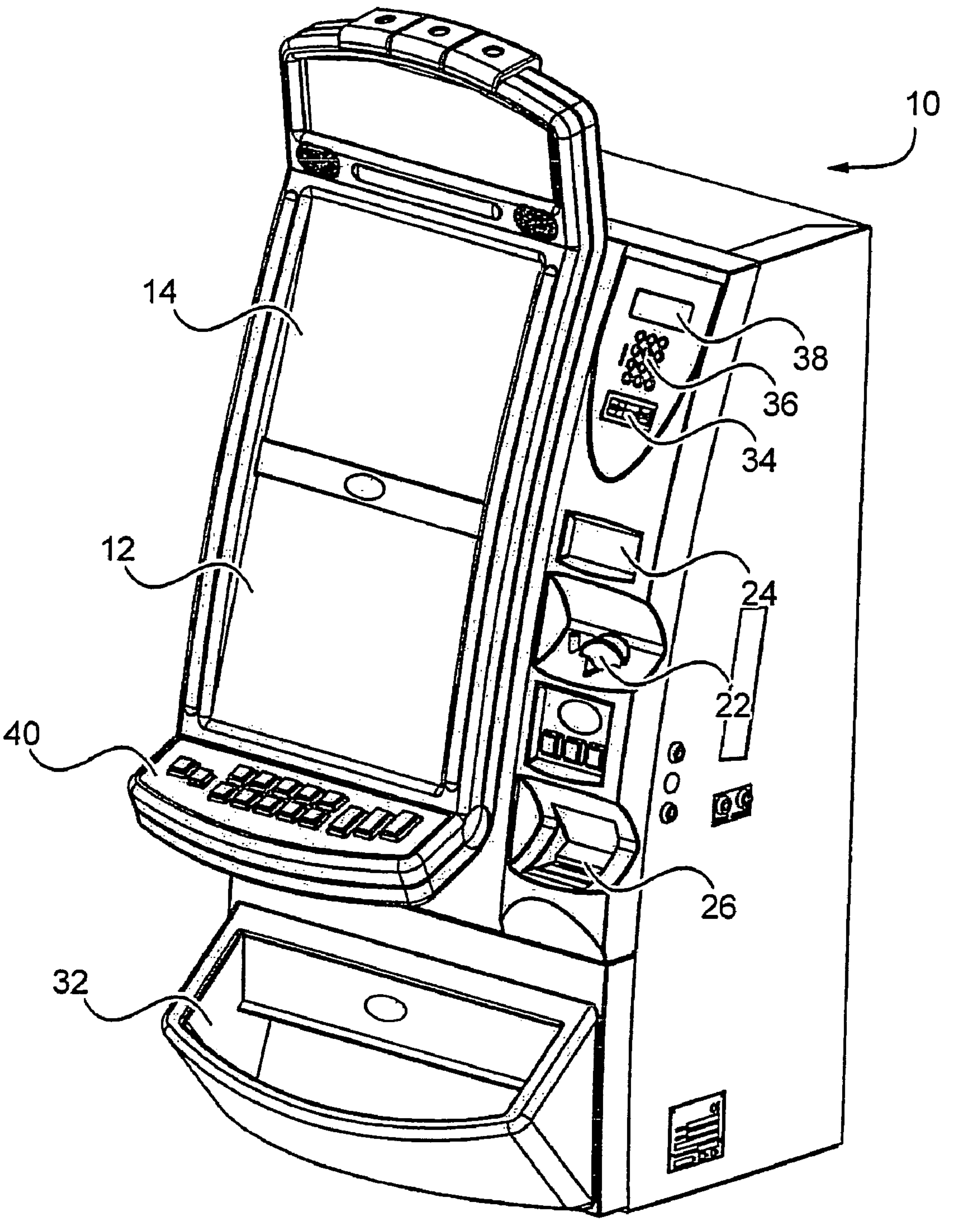
FIG. 1 is a perspective view of a gaming machine that contains the game controller board and secure dongle in accordance with one embodiment of the invention.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. A second display 14 provides game data or other information in addition to display 12.

A coin slot 22 accepts coins or tokens in one or more denominations to generate credits within machine 10 for playing games. A slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 40 include any buttons needed for the play of the particular game or games offered by machine 10 including, for example, a bet button, a repeat bet button, a play two-ways button, a spin reels button, a deal button, hold cards buttons, a draw button, a maximum bet button, a cash-out button, a display paylines button, a display payout tables button, select icon buttons, and any other suitable button. Buttons 40 may be replaced by a touch screen with virtual buttons.

Figure 2:
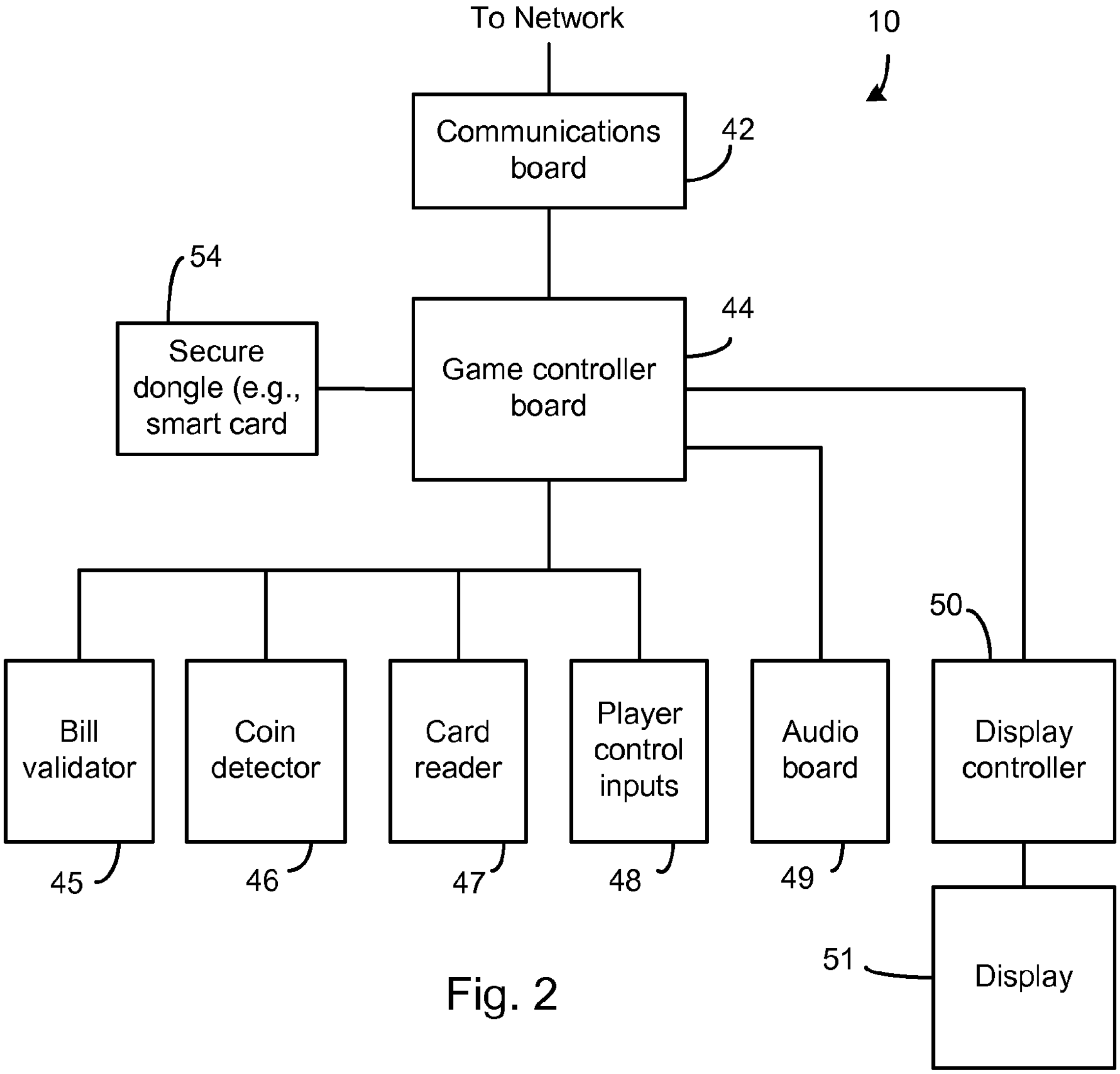
FIG. 2 illustrates the basic functional units in the gaming machine of FIG. 1.

FIG. 2 is a block diagram of one type of gaming machine 10 that may be connected in a network and may include the software and hardware to carry out the present invention. All hardware not specifically discussed may be conventional.

A communications board 42 may contain conventional circuitry for coupling the gaming machine 10 to a local area network (LAN) or other type of network using Ethernet or any other protocol.

The game controller board 44 contains memory and a processor for carrying out programs stored in the memory. The game controller board 44 primarily carries out the game routines.

Peripheral devices/boards communicate with the game controller board 44 via a bus. Such peripherals may include a bill validator 45, a coin detector 46, a smart card reader or other type of credit card reader 47, and player control inputs 48 (such as buttons or a touch screen). An audio board 49 converts coded signals into analog signals for driving speakers. A display controller 50 converts coded signals to pixel signals for the display 51.

The game controller board contains a CPU, program RAM, and other circuits for controlling the operation of the gaming machine. Detail of one type of controller board is described later with respect to FIG. 11.

The controller board 44 has a smart card I/O port for electrically contacting the power supply pads, clock pad, and serial I/O pad of a standard secure smart card 54 (also referred to herein as a dongle 54), such as one used for banking around the world. Such smart cards are extremely secure and their physical design and operation are dictated by various well known ISO standards, incorporated herein by reference. An overview of smart cards and their security features are described in the articles, "An Overview of Smart Card Security," by Siu-cheung Chan, 1997, available on the world wide web at http://home.hkstar.com/~alanchan/papers/smartCardSecurity/, and "Smart Card Technology and Security," available on the world wide web at http://people.cs.uchicago.edu/~dinoj/smartcard/security.html. Both articles are incorporated by reference to illustrate the pervasive knowledge of smart card security.

Figure 3:
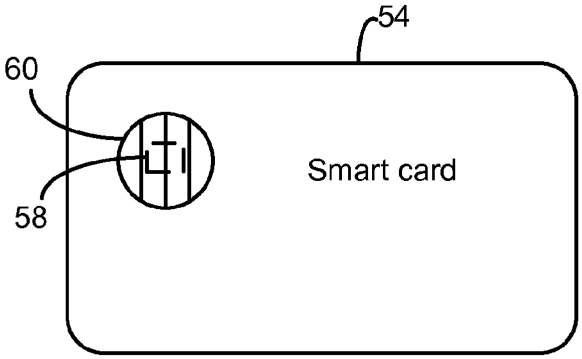
FIG. 3 is a front view of a conventional smart card performing encryption/decryption and outputting a particular response after a challenge is transmitted by the host CPU.

FIG. 3 is a simplified front view of a standard smart card (dongle 54). The card itself is plastic. The card has embedded in it a silicon chip 58 (shown in dashed outline) containing a microprocessor (e.g., 8 bit) and memory. A printed circuit 60 provides metal pads for input voltage, ground, clock, and serial I/O. A smart card designed in accordance with the ISO standards is tamperproof, whereby the stored software cannot be read or copied using practical techniques.

Detailed preferred requirements (but not mandatory) of the system are presented below. A less secure technique may be accomplished without all of the below preferred requirements. A general overview of the preferred dongle 54 capabilities is as follows.

1. The dongle must be able to store data which is non-readable and non-copyable by access to its I/O pads.
2. The dongle must have sufficient memory to store the various crypto keys and the response/configuration data.
3. The dongle must be able to perform encryption and decryption functions.
4. The dongle must have a secure hash function. (A hash function performs an algorithm on any length data and generates a fixed length hash value that is uniquely associated with the original data. The hash value is typically used to authenticate data.)
5. The dongle must not affect or change the normal game program functions except to possibly delay the program execution or halt its execution.

In one embodiment, the dongle receives the challenge data from the host CPU and performs a function on the challenge data. The function performed is kept secure in the dongle. The function can be any suitable function. The function may be a proprietary or standard crypto algorithm that uses secret keys to create an encrypted version of the challenge data by, for example, using RSA, AES, 3DES, or Elliptic Curves. The crypto keys for the function are stored in the dongle. The host CPU then decrypts the dongle response using its secret key(s), which are the counterparts to the secret keys on the dongle, and compares the response to an expected response. If there is a match, then the host CPU knows that the smart card is authentic. The game program then continues its normal flow.

Figure 4:
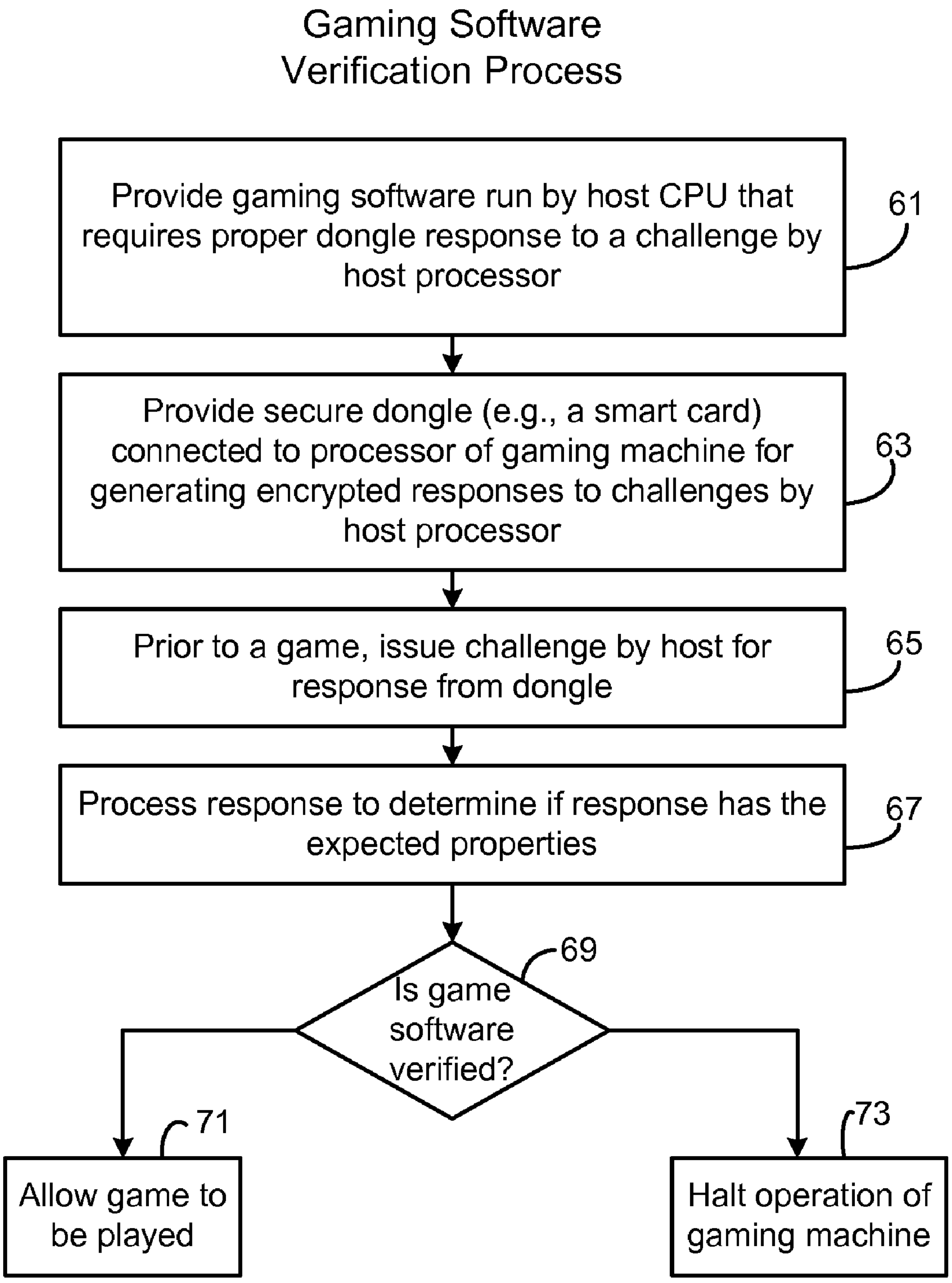
FIG. 4 is a flowchart of one embodiment of the gaming software verification process.

FIG. 4 is a flowchart that depicts the basic steps in the gaming software verification process. In step 61, the manufacturer provides gaming software run by a host CPU inside the gaming machine, where the gaming software issues a challenge (data of any length) to the dongle and must receive a proper response (e.g., an encrypted version of the challenge) in order for the gaming software to carry out the game. The game may be a video reel type game played on a slot machine or any other game.

In step 63, the manufacturer of the gaming machine or an authorized customer inserts a secure dongle into an I/O port of the game controller board (or other location) for communicating with the host CPU. Typically, the manufacturer will insert the dongle prior to the machine being shipped to the customer. The dongle may also be distributed with the game software. The dongle is programmed to process a challenge from the host CPU and provide a response. Only a particular response will allow the gaming program to continue. The dongle will typically remain in the gaming machine.

In another embodiment, the gaming machines are client machines, and the game program is carried out on a remote server. In that case, the dongle may be connected internal to the gaming machine for communication with the server, and/or the dongle may be connected at the server location.

In step 65, prior to a game being played on the gaming machine, the host CPU issues a challenge for response by the dongle.

In step 67, the dongle responds, and the host CPU determines if the response has the expected properties. The response may be an encrypted version of the challenge using one or more crypto keys programmed into the dongle. The host CPU then decrypts the response and compares it to an expected response. The expected response may be generated by the CPU using the same functions used by the dongle. RSA, DES, and 3DES are examples of suitable encryption/decryption techniques. The published standards for these techniques are incorporated herein by reference. The encryption and decryption may use the same secret key (symmetric algorithm), or different keys are used for encryption and decryption (asymmetric algorithm). In RSA, the sender encrypts a message using the receiver's public key, and the receiver decrypts the message using the receiver's private key. The public key and the private key are mathematically related.

In step 69, if the host CPU determines that the dongle response is the expected response, the host CPU continues the normal gaming program (step 71), and the player plays the game. If the host CPU determines that the dongle response is not the expected response, the host CPU halts the normal gaming program (step 73), and may then issue an alarm or other indication that the dongle is not certified. This suggests that the gaming machine software is not legitimate or that an unauthorized user is attempting to run the game software.

Figure 5:
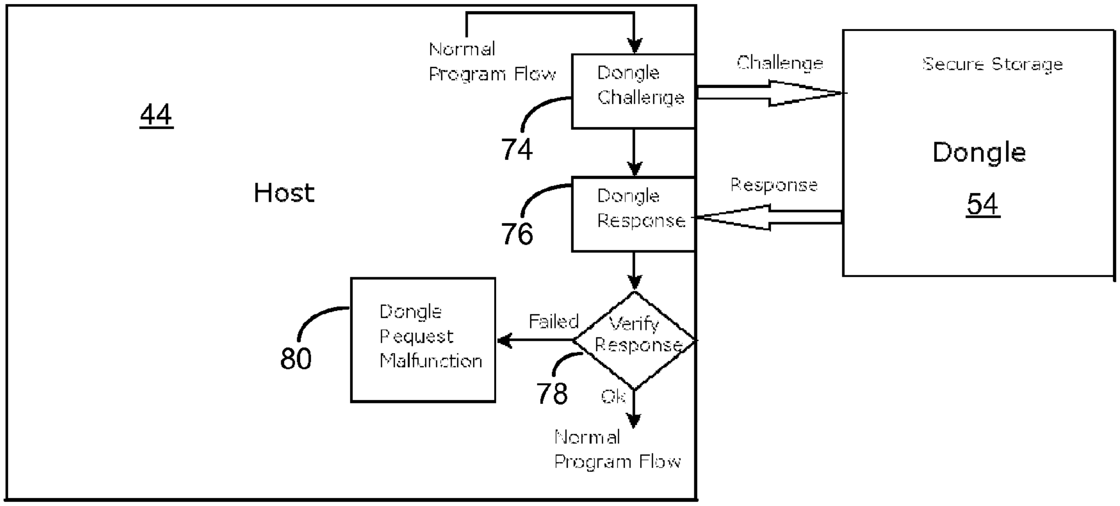
FIG. 5 is another representation of the gaming software verification process.

FIG. 5 is another way of depicting the process of FIG. 4. In FIG. 5, the game controller board 44 (the host) carries out the normal program flow until it gets to the program instruction to issue a challenge (step 74) to the dongle 54. The dongle 54 then responds (step 76) to the challenge with a message uniquely determined by the secret program/data stored in the dongle's memory chip. In step 78, the host verifies the response. If the response is not correct, the host determines that there is a dongle request malfunction (step 80) and may, for example, halt the normal program flow. If the response is correct, the host continues the normal program flow. There will only be a very slight delay in the normal program flow using this technique, so the verification process may be used prior to every game being played.

The dongle challenge/response routine may be carried out during any portion of the normal program flow.

Certain preferred detailed specifications for one type of dongle are provided below. The preferred specifications are not required for the invention.

| Detailed Specifications for Dongle Request | |
|---|---|
| CP | Copy Protection |
| CRP | Challenge - Response - Protocol |
| DR | Dongle Request |
| GAL | Gate/Generic Array Logic |
| RNG | Random Number Generator |
| DRMF | Dongle Request Malfunction |
| MAC | Message Authentication Code |

The next section introduces design and implementation details for realizing copy protection with a secure dongle approach.

The purpose of the design is to have a general basis on how to implement a copy protection scheme with dongles as secure as possible.

1.1 Dongle

The basic requirements for the dongle are that: 1) it is a separate device that can communicate with the game controller board; and 2) it is able to store data that is non-readable and non-copy able using practical techniques. In this invention dongles are used for establishing challenge—response—protocols.

The following types of dongles are suitable. The list is classified by security levels in descending order.

1.1.1 Types of Dongles

Smart Cards or Smart Card Controller Chips

This is the state of the art technology for protecting information. Smart Card manufacturers invest a lot in protecting their Smart Cards against hardware attacks. It's the most suitable device for cryptographic applications and therefore very useful for copy protection.

General Purpose Microcontrollers

Certain general purpose microcontrollers, such as an 8-bit microcontroller available from various vendors, may be used as a dongle. This controller can be locked after programming and serve therefore as a secure storage media. Additionally, the controllers have enough computational power to execute strong cryptographic algorithms.

Compared to Smart Cards these controllers are not mainly designed for cryptographic applications and, as a consequence, provide less protection against hardware attacks.

Gate/Generic Array Logic (GAL) or Programmable Logic devices (PLD)

A GAL or PLD is a chip where a small electronic circuit can be programmed by firmware after manufacture. Some GALs contain a mechanism for locking the content. However, it is not as secure as other alternatives.

Off the shelf solutions, as provided by companies such as Alladin 1.2 Preferred Requirements of Dongles R1 The dongle should be able to store data, which is non-readable and non-copyable from the outside.

R2 The dongle should provide enough secure storage space to store at least one asynchronous key pair, at least one synchronous key, and configuration data.

R3 The dongle should have at least one strong asymmetric crypto function for encryption and digital signature, like RSA or Elliptic Curves.

R4 The dongle should have at least one strong symmetric crypto function, like AES or 3DES.

R5 The dongle should have at least one secure hash function, like SHA-1 or SHA-256.

1.3 Preferred Requirements of Dongle Requests (DRs)

This section gives a list of general requirements that DRs must fulfil.

R1 A DR should not perform any "crucial gaming device functions".

R2 A DR should be able to execute a DR malfunction (e.g. HALT CONDITION). A HALT CONDITION causes the DR to perform a HALT of the gaming machine.

R3 A DR should not contain self-modifying executable code. That means, a DR should not generate executable code at runtime that could be executed by the host processor.

R4 A DR should not affect normal program execution, except execution time. The affected execution time should be as low as possible for successful DRs. Each DR results in a delay. Some delays may have an impact on game execution time. If this delay is accepted or not has to be decided for each type of DR. For nonsuccessful DRs, where a DR malfunction is called, the above execution time requirements are not valid.

R5 Different types of DRs should be implemented.

R6 One set of DRs should use proprietary algorithms.

1.4 Static Dongle Requests

There are two main types of DRs: static DRs and dynamic DRs.

In the static DR, the function, which calculates the response from the challenge, is exclusively available in the dongle itself. Therefore this function is always secret. Static DRs receive a fixed challenge and reply with a fixed response. The advantage is the simplicity, since they are easy to implement and fast.

The request procedure for a specific static DR works as the following:

```
x=CONSTANT_CHALLENGE
y=CONSTANT_RESPONSE
y'=DR(x)
if (!verify(y, y'))
    Malfunction ( )
else
    continue normal program execution
```

The values x and y are stored on the host application. y' is the result of the DR. The values CONST$_{13}$CHALLENGE and CONST$_{13}$RESPONSE are only place holders for different challenge response pairs.

DR is a place holder for a specific static DR, which has a specific function that calculates the result y'.

The secret function can be a proprietary algorithm or a standard symmetric algorithm, where the secret key is stored exclusively on the dongle.

The verification function verify generally checks whether y' matches the expectations or not. A very simple verification function would be, for instance, a one-to-one compare.

1.5 Dynamic Dongle Requests

Dynamic DRs offer a much higher sample space than static DRs. For dynamic DRs, both the application and the dongle have to calculate a DR function to be able to do the comparison.

Dynamic DRs should have a time-variant parameter which needs to be unpredictable and non-repeating. Typically sources for these values are random numbers, timestamps, or sequence numbers. There are good pseudo random number generators available.

Algorithms for the symmetric encryption can be AES, TripleDES or TEA with different key lengths.

1.5.1 Dongle Requests Using Symmetric Encryption

In symmetric encryption, the algorithm as well as the used key must be known from both communication partners, the host application and the dongle. Therefore, different keys should be used for different DRs. The pseudo code describes the procedure for a DR:

```
x = getRand( )                                  Challenge
y = f_K'(x)
y'= DR(x)                                       Response
--------------------------------------------------------------------------------
if (!verify(y, y'))                             Verification
    Malfunction( )
else
    continue normal program execution
```

A random number is chosen from the system random number generator. The DR function $f_{K'}(x)$ is calculated by the host application and on the dongle. The verification function verify generally checks whether y' matches the expectations or not. A very simple verification function would be, for instance, a one-to-one compare.

For symmetric encryption, a block cipher or a stream cipher can be used.

1.5.2 Dongle Requests Using Keyed One-Way Functions

Due to computational limitations or export restrictions, the symmetric encryption function can be replaced by a MAC (Message Authentication Code) function. Rather than decrypting and verifying, the results of the MAC functions are compared.

There are generally four types of MAC function available:

1) MACs based on symmetric block ciphers
   For verification methods of the dongle contents, MACs based on block ciphers can be used. One suitable type is a CBC-MAC based on DES, 3DES or AES.
2) MACs based on Hash functions
   This is simply concatenating a key to the input data of a hash function.
3) Customized MACs
   Suitable types may be a MMA or MD5-MAC.
4) MACs for stream ciphers
   These MACs are designed for stream ciphers. They can be implemented by combining the output of a CRC checksum with a key.

For the purpose of the Dongle Requests approach, 2 or 3 should be used.

1.5.3 Dongle Requests Using Asymmetric Encryption

Challenge-Response Protocols (CRPs) can also use asymmetric encryption approaches where secrets do not need to be share by the host application and the dongle. In asymmetric encryption, only the public key needs to be stored in the host application. These are the most secure DRs, but relatively slow.

An asymmetric DR looks like:

```
x = getRand( )                                  Challenge
y = f_kpub'(x)
x'= DR(y)                                       Response
--------------------------------------------------------------------------------
if (verify(x, x'))                              Verification
    Malfunction( )
else
    continue normal program execution
```

In this case x is encrypted with the public key by the host application and sent to the dongle. The dongle decrypts y with the private key and sends it back.

The verification function verify generally checks whether y' matches the expectations or not.

For asymmetric encryption, RSA should be used.

1.6 Dongle Request Malfunction (DRMF)

The Dongle Request Malfunction (DRMF) is a function that is implemented when the response of the dongle does not match with the expected one.

DRMF must not influence gaming behaviour, except for a called HALT condition. There are several types of HALT conditions and also different methods to trigger them. For example a HALT condition can be reported to the user or not. There should be DRMFs with different behaviour in the system at the same time. Suitable DRMFs are presented below. The selection may be influenced by jurisdictional limitations.

The following DRMFs use defined normal exception or operation procedures:

DRMF 1 Triggers a Machine Lock. No message to the user. Machine reinitialisation is necessary.

DRMF 2 Same as DRMF 1, except the user gets the information that the machine is locked.

DRMF 3 Same as DRMF 1, except that the lock is releasable with reboot.

DRMF 4 Same as DRMF 2 except that it is releasable with boot.

DRMF 5 Reset the machine by hardware reset.

DRMF 6 Inhibit machine startup.

DRMF 7 Disable user input.

DRMF 8 Disable user input, except "cash out"

Preferred Detailed Specifications of Smart Card Dongle 1.7 Electronic Gaming Machine An Electronic Gaming Machine (EGM) is a gaming device, which has at least one main microcontroller board (MMB) that contains a processor and controls the game and its presentation on the screen. Additional microcontroller boards are optional in the EGM.

This board might have a secure area (SA) that contains at least one Smart Card Access Key (SCAK) and protects it from being accessed from the outside. Thus, the key is assumed to be secure and the possibility of compromise is minimal.

1.7.1 Smart Card

The smartcard (SC) is attached to the MMB of the EGM and contains the jurisdiction specific Game Key (GK). A smart card may be dedicated to one entity (casino, casino group, etc.) and is permitted to be used only by this entity. In another embodiment, each EGM has its own unique smart card. In another embodiment, each game type has its own unique smart card. It is not possible to decrypt the application software and run a game on an EGM without a valid smart card.

To achieve the trust relationship between an entity and the manufacturer, the smart card and all information on the smart card must remain the property of the manufacturer.

1.7.2 Entity

An entity is a customer, a casino, a group of casinos, or anybody who legitimately buys the EGMs and is allowed to operate them. An entity obtains smartcards from the EGM manufacturer.

Controlling the Entities is a method for the EGM manufacturer to regionalise the control of software distribution.

1.7.3 Application Data

The Application Data comprises all software that runs on an EGM (game software, operating system, etc.). It is stored on the mass storage device (MSD) in the EGM in an encrypted form using a symmetric algorithm. The GK, which is used for encryption and decryption of the application data, differs from jurisdiction to jurisdiction.

For EGMs that rely on a remote application server for carrying out a game, a portion of the Application Data is stored on the MSD of the server.

1.7.4 Mass Storage Device

The Mass Storage Device (MSD) contains the encrypted application data and some unencrypted, executable software (e.g., the operating system). This can be, for instance, a hard disk, compact flash card, or a CD-ROM.

1.8 Definition of Keys

This section describes all the different keys that will be used in the security concept.

1.8.1 Smart Card Access Key

Every EGM has at least one Smart Card Access Key (SCAK). This is a symmetric or asymmetric cryptographic key. Using this SCAK the EGM is able to be authenticated by the SC and to establish an authenticated and encrypted connection between itself and the SC. If the SCAK is not available or incorrect, the smart card denies access and the EGM does not carry out the game.

The SCAK should be stored in a tamper resistant storage device on the EGM. This means that it must not be possible to access or to copy this SCAK from the EGM in any practical way.

1.8.2 Game Key

The Game Key (GK) is the symmetric key used to decrypt the EGM application data. It is unique to each jurisdiction and each game, or unique based on other associations. This separation reduces the impact if a GK is compromised. If it is compromised in one jurisdiction, the intellectual property is still protected in all other jurisdictions.

The Game Key is stored on the SC connected to the Main Microcontroller Board (MMB) and it is used for decryption.

1.8.3 Manufacturer's Private/Public Key Pair

The particular manufacturer's private/public key pair is used to identify smart cards as that manufacturer's smart cards. The public key is stored on each SC. The private key is used to sign the public key of a SC (which is unique for each SC). This signature is used to identify the particular manufacturer's SC.

The manufacturer's public key is stored immutably on each SC issued by the manufacturer. Its private key is used to "sign" each public key of all that manufacturer's secure devices. This makes the key exchange between two SCs much easier. If SC "A" wants to authenticate SC "B", it just checks the signature of SC "B's" public key. If that key was signed by the manufacturer, SC A knows that SC B was issued by that manufacturer and that it can trust SC B.

The usage of this manufacturer's key makes the key handling for that manufacturer a lot easier. This is the case because no private keys of the SCs except that manufacturer's private key and the entity-specific private keys need to be stored in the manufacturer's internal key-database. It also makes the SCs more generic. No suites of keys need to be stored on the SCs and, thus, each SC works together with each other identified SC.

The manufacturer's private key is very sensitive, and it must never be made public. Therefore, this private key must be stored in a secure environment (e.g., in a smart card) controlled by the manufacturer. Only a restricted number of persons are allowed to have access to this key.

Entity Private/Public Key Pair

The entity private/public key pair is used in a mechanism to identify a smartcard as a smartcard dedicated to one entity. It is unique for each entity. The entity public key is stored immutably on each SC issued by the manufacturer to an entity. The entity private key is used to create data (e.g. licenses) issued to an entity and to show the SC that it is allowed to store that data on itself.

The private entity keys are sensitive and must never be made public. Therefore, these private keys must be stored in a secure environment.

1.8.4 Operating System Verification Key

The Operating System Verification Key (OSVK) is like the manufacturer's key, a private/public RSA key pair. It is used to verify the authenticity of the Operating System (OS) loader and the OS image on the mass storage device at EGM start-up. Therefore, these two modules are signed by the private OSVK. On EGM start-up, the signatures of the loader and of the image are verified using the public OSVK. The OSVK public key is stored on each manufacturer's EGM. If the signature is correct, it is guaranteed that the OS was not changed and can be trusted.

The public OSVK is stored on every EGM. Since it is used to verify signatures it must be trustworthy and thus be stored in a write-protected memory area of the system (preferably in the BIOS). Since no signatures can be created with the public OSVK, it does not need to be read-protected.

The private OSVK key is very sensitive and it must never be made public. Therefore, this private key must be stored in a secure environment (e.g., in a smart card) controlled by the manufacturer. Only a restricted number of persons are allowed to have access to this key.

1.9 Preferred Detailed Description of Architecture of Main Microcontroller Board (MMB)

There are two main design goals of the security concepts described herein. The first goal is to prevent anybody from making a 1:1 copy of the game software and running it on another EGM. The second goal is to prevent the intellectual property (IP), which is the software and data, from being accessed, copied and/or modified by any attacker.

This section gives an overview of the general security architecture for a single board as well as for a multi-board EGM.

1.9.1 Single Board EGM

The EGM only has a single MMB. The SC is directly connected to the MMB and an authenticated and encrypted connection between these two devices is established to prevent anybody from listening to the communications between the MMB and the SC or getting access to sensitive data stored on the SC, such as the GK.

The SC has cryptographic and PKI (public key infrastructure) capabilities to do encryption and authentication. If the SC is not attached to the MMB the EGM will not run a game. It also holds secrets and other data that are checked during runtime by the game. This prevents anybody from running a game without an SC and from making a 1:1 copy of the game and running it on another EGM.

The protection of the IP is achieved by storing the application data for the EGM in an encrypted form on the Mass Storage Device MSD. The key to decrypt it at start-up, the so-called Game Key (GK), is stored on the SC connected to the MMB.

Figure 6:
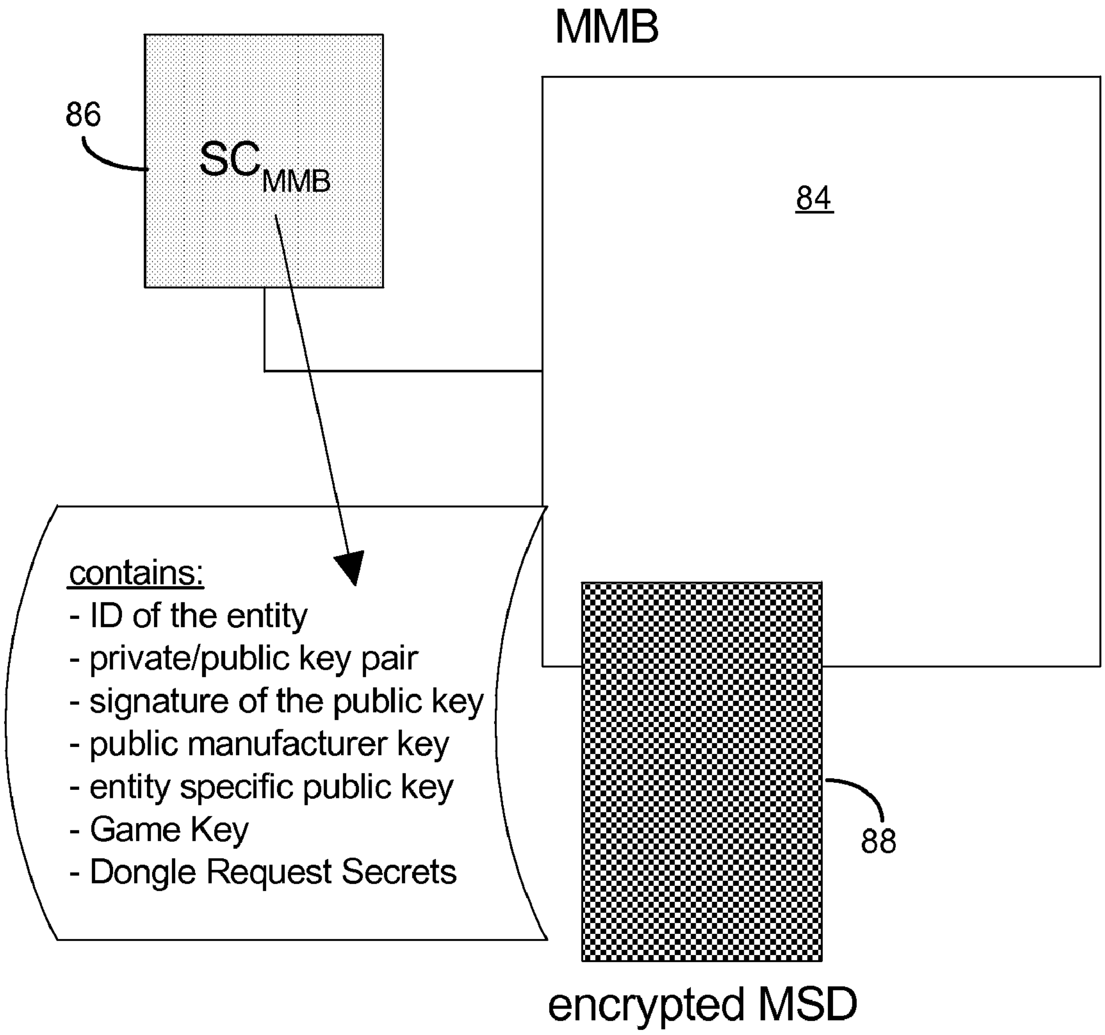
FIG. 6 illustrates a smart card and mass storage device interfacing with a main microcontroller board (MMB).

FIG. 6 shows the architecture of an EGM with a single board. The MMB 84 has a Secure Area (SA) to store the SCAK in a protected manner and to detect any possible changes to the BIOS. The $SC_{MMB}$ 86 plugs into a smart card reader connected to or on the MMB 84. The MSD 88 may be a peripheral device attached to the MMB or an embedded device on the MMB. Since the application data on the MSD is encrypted, it is not very important that the MSD itself be secure.

1.9.2 Multi Board EGM

When an additional board is used in the EGM, a third protection mechanism is applied. That is the encryption of the communication between the MMB and the additional board. The second board may also have a SC, though this SC is optional. If no SC is connected to the second board, all the cryptographic and PKI functionality must be implemented in software on that board.

Figure 7:
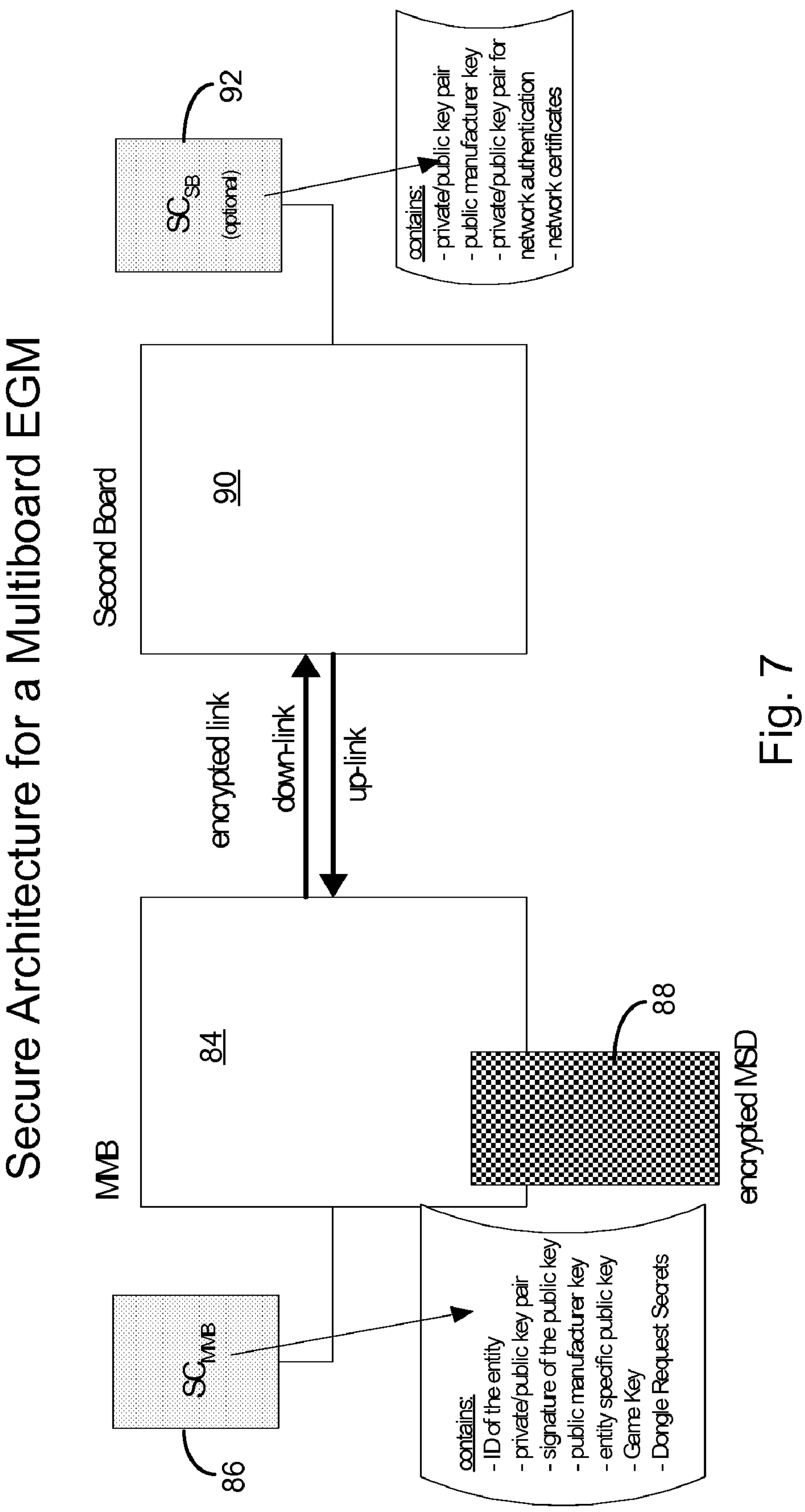
FIG. 7 illustrates the use of a smart card connected to each board in a gaming machine to provide secure communications between boards.

FIG. 7 shows the security design architecture of the EGM when SCs are integrated on both boards.

For simplicity, this document only shows the process for a two board EGM. Though, the concept can be expanded to more than two boards. Therefore, the additional board is referred to as "Second Board" 90 and the (optional) SC 92 attached to this board is called $SC_{SB}$.

Overview of Security Protection and Start-Up Sequence

The below section contains the different protection mechanisms of the security concept including boot security, dongle requests, and further runtime protection of the EGM.

1.10 EGM Start-up

The boot process of the EGM can be separated into two different tasks, which will be refined in the further sections:

Operating System (OS) boot sequence

Application start-up sequence

The OS boot sequence deals with the start-up of the OS, whereas the application start-up sequence is used to decrypt the application data software and start the game To start the system the MMB needs to contain two different keys:

Public OSVK: for verification of the OS loader and the OS image stored on the MSD SCAK: to get access to the SC and read the GK from there The public OSVK is stored on every EGM. Since it is used to verify signatures, it must be trustworthy and stored in a write-protected memory area of the system (e.g. in the BIOS).

Since no signatures can be created with the public OSVK it does not need to be read protected.

1.10.1 Secure Operating System Boot Sequence

The main job of the OS boot sequence is to guarantee that the OS loader and the OS image on the MSD were not compromised. To achieve this verification these two software modules are signed with the private OSVK. Before they are executed, the signature of each module is checked using the public OSVK. The first two steps are executed by the BIOS, the further two steps are executed by the OS loader:

1. BIOS—load OS loader from MSD
2. BIOS—check signature of OS loader with the public OSVK and start the loader
3. OS Loader—load OS image from MSD
4. OS Loader—check signature of OS image and the init-applications with public OSVK and start OS image and the init-applications 1.10.2 Application Start-up Sequence After the OS has been started, the init-applications take control over the system. Now the SCAK is used to get access to the SC, read the GK and decrypt the applications. Then the applications are verified and, if everything was ok, the game is started.

The application start-up sequence can be separated into 5 different steps.

1. Establish an authenticated and secured connection to the SC using the SCAK.
2. Access GK in the SC.
3. Load and decrypt application data.
4. Start applications.
5. Run the game.

1.10.3 Mass-Storage-Device Partitions

Figure 8:
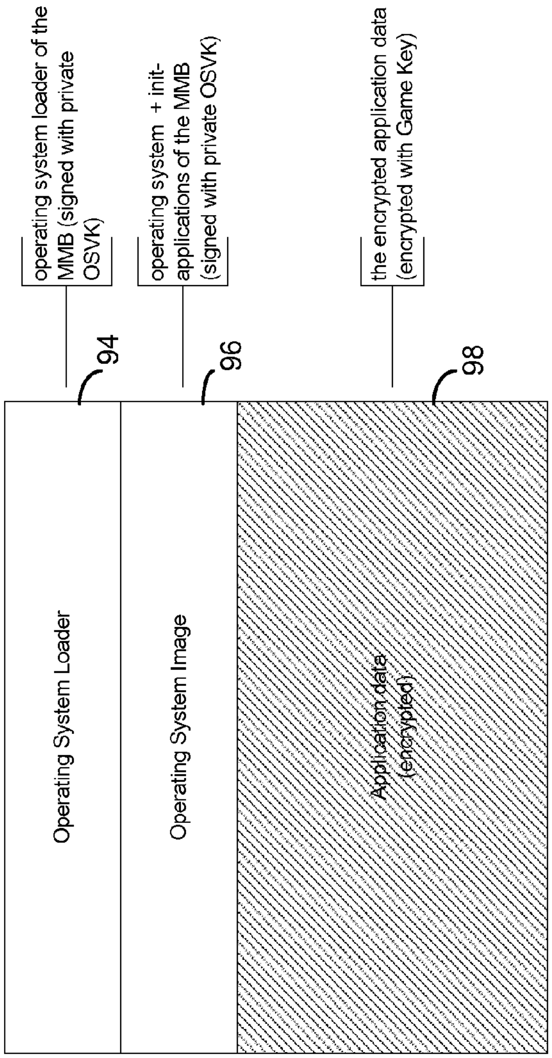
FIG. 8 illustrates the different data types stored on the mass storage device (e.g., a CD or hard disc).

As shown in FIG. 8, the MSD can be divided into 3 different sections:

The OS loader 94: This is the loader for the OS for the MMB, signed with the private OSVK.

The OS image and the init-applications 96: This is the OS image and the initialization applications for the MMB, signed with the private OSVK. It provides access to the $SC_{MMB}$.

The encrypted applications 98: These are the encrypted applications for the MMB and for the optional additional boards. They are decrypted during start-up using the GK that is stored on $SC_{MMB}$.

1.11 Dongle Requests

During runtime, the MMB needs to check whether the $SC_{MMB}$ is still connected. This can be done in various ways, such as:

Plain commands: The EGM sends plain commands to the SC to see if it is still there.

General dongle requests: Dongle requests have been previously described.

1.12 Multi Board EGM

When the EGM is a multi board machine, also the communication between MMB and the additional boards is encrypted. For simplicity, this document only shows the process for a two board EGM. Though, the concept can be extended to more than two boards.

For that case, an encrypted and authenticated connection between the MMB and the additional boards is established at the start-up of the EGM. As shown in FIG. 7, the connection consists of two separate connections: one from the MMB to the second board called the "down-link", and one from the second board to the MMB called "up-link". Each of these connections is encrypted with a different session key. Alternatively, the same key can be used. The keys are generated randomly and independently on the boards by the SCs and can be changed during runtime. If no SC is available on the second board, the "up-link" key is generated by the board itself. The encryption/decryption of data sent over this connection can be done in software or on the dongle and not on the SCs.

The recommended algorithm to be used for this symmetric encryption is the Advanced Encryption Standard (AES), namely the Rijndael algorithm.

1.12.1 Security Protocol

To achieve this encryption and authentication, security can either be implemented within or atop the Network Layer or atop the Transport Layer referring to the standard ISO/OSI network protocol model. That means that it works with a connection oriented as well as a connection less protocols.

For the cryptographic tasks during the session key exchange process, SCs are used as the secure cryptographic devices and as a secure storage for the authentication keys.

Figure 9:
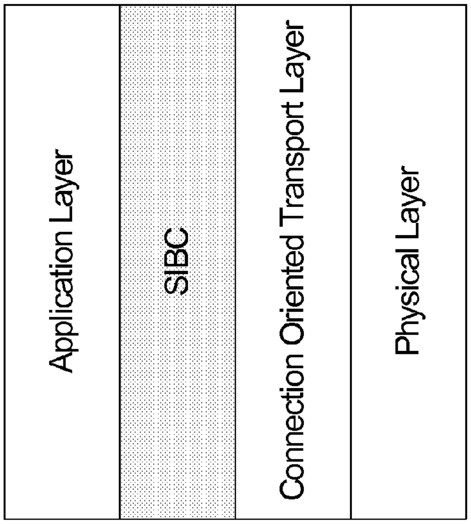
FIG. 9 illustrates the communication protocol between boards.

An example for implementing a custom secure protocol is shown in FIG. 9, which is self-explanatory. However, protocols such as SSL/TLS or IPSec could just as easily be used.

The physical connection between the MMB and the second board does not really matter. This example uses a connection oriented protocol (e.g. TCP/IP) at the Transport Layer, and the Security Protocol is set atop this layer. It is referred to as Secure Inter Board Communication (SIBC). SIBC contains all the functionality to establish a secure connection, to do the communication encryption, and to access the smart card cryptographic functionalities. The protocol stack will be equal on MMB and the second board.

1.12.1.1 Example for Connection Establishment and Key Exchange Protocol

The process of establishing the authenticated encrypted links between MMB and the second board applies asymmetric cryptography as a key exchange mechanism. It is described in the flow diagram of the key exchange protocol in FIG. 10, which is self-explanatory.

Figure 10:
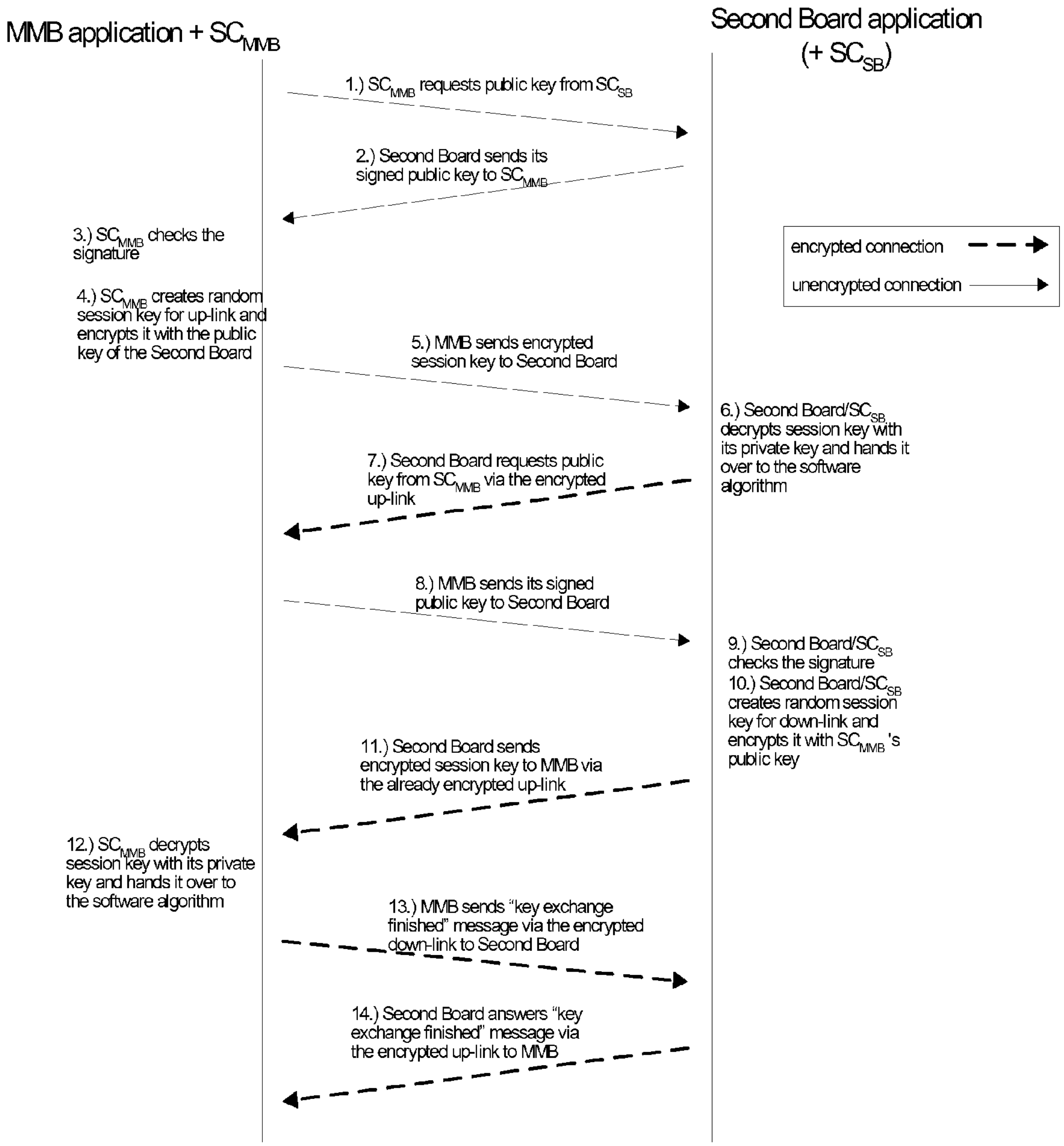
FIG. 10 illustrates the exchange of the encryption and decryption keys between the smart cards and multiple boards to provide secure communication between boards.

FIG. 10 assumes that there is a smartcard available on the second board. If not, then the cryptographic functions on the second board are computed in software.

Since the SCs themselves only have limited functionality most of the protocol functions are implemented in software. That means that the SCs are only used for the key exchange in the protocol. Only the creation of session keys, the verification of the counterpart's signature of the public key, and the decryption of the encrypted session keys are performed on the SCs.

This key exchange protocol can be repeated during the runtime of the EGM. It is recommended to renew the session keys (and exchange them again with the described Key Exchange Protocol) several times during runtime to decrease the possibility of somebody listening to the data traffic.

1.12.1.2 Example for Session Key Generation

The session key for the encrypted link is generated by the SC. In order to create this key, the SC generates a random number. This number is hashed with an algorithm like SHA-1, preferably again on the SC. This hash result is the session key, which is sent to the software algorithm on the board to which the SC is connected for link decryption. The key is also encrypted with the other board's (SC's) public key and sent to that board for link encryption.

The "data portion" that is encrypted with the public key of the corresponding SC for key exchange should not only be the session key itself but also additional (random) data.

The SC is the secure device in the system. It must provide PKI functionality as well as symmetric cryptography and secure hash algorithms. Furthermore, it also must provide secure data storage. The access to the cryptographic functions and the secure data must be only granted, if the application on the MMB was authenticated by the SC, by using the SCAK.

Since the task of the SC is to create a secure link between the two boards, it must have the ability to create symmetric session keys, and it must provide public key facilities. In order to talk to an SC the EGM needs to hold a Smart Card Access Key (SCAK). This prevents unauthorized personal from misusing an SC. It is also possible to create the session key on the Host.

Continuous checks are done during runtime if the $SC_{MMB}$ is still connected to the EGM. If the $SC_{MMB}$ is missing, the EGM cannot operate, as it cannot decrypt the application data. In a multi board EGM the encrypted link between the MMB and the second board cannot be established without the SC.

1.13 Smartcard (SC) on the MMB

A SC, which is referred to in the following as $SC_{MMB}$, will be attached to every EGM. It holds essential data for decrypting the game at start-up (the GK), for establishing a secure link between MMB and secondary boards on a multi board EGM, and for runtime protection, and holds additional data. In order to talk to $SC_{MMB}$, each EGM needs to have an SCAK. With that key an authenticated and encrypted connection can be established between $SC_{MMB}$ and EGM. This prohibits an unauthorized person or machine from reading the GK out of the $SC_{MMB}$.

1.13.1 Contents of $SC_{MMB}$

The $SC_{MMB}$ contains

IDs of the entity (casino, casino group, etc.) and IDs of the jurisdiction

A private/public key pairs

Signatures for the public key. These signatures are created with the manufacturer's private keys.

The manufacturer's public keys

Entity specific public key to authenticate data that will be stored on the EGM (e.g. GK, license, etc.)—optional.

The Game Keys for the game

Dongle Request Secrets

The entity ID and the jurisdiction ID show, which entity in which jurisdiction is allowed to use the SC.

Private/public key pairs are unique for each security device. This key pair is generated on the SC at initialisation (this process is called "personalization"), and the private key must never leave the SC. The public key is also stored in a database controlled by the manufacturer together with the serial number of the SC. This public key is signed by the manufacturer's private key. This signature is the proof to identify the SC to other SCs as the EGM manufacturer's device.

The signature of the public key is a hash value of the SC's public key encrypted with the private key. It is used to identify the manufacturer's $SC_{MMB}$ to another SC by the same manufacturer.

The manufacturer's public key is used to authenticate another device by the manufacturer. As was described above (about the establishment of a secure connection between MMB and a second board), SC "A" sends its signed public key to SC "B". SC B checks this signature by using the public key. If the signature is valid, SC A knows that SC B is that manufacturer's device.

The "entity specific public key" allows the SC to check whether a license or additional data that should be copied onto the card is valid or not. Furthermore, this key is unique for each entity (casino, casino group, etc.). So if a license is issued it is only valid for one entity. If an entity sells an EGM to another entity they would need to contact the EGM manufacturer for a new SC. This helps to control the flow of machines and software. This key is optional and only necessary when an in-the-field licensing update is implemented.

The GK is used to decrypt the applications and the game at start-up.

The secrets and additional data can be used for so called dongle requests. With these secrets, the $SC_{MMB}$ is able to prove to the application that it is really the SC it is supposed to be.

$SC_{MMB}$ is a removable device. That makes it very easy to take a game from one EGM to another one. Only the SC, which fits a game, needs to be transferred to operate the game on the other EGM, providing the target EGM has the MSD with the game software package inserted.

1.13.2 Requirements for $SC_{MMB}$

The SC must confirm to some hardware and software requirements. Most of them are concerning cryptography and secure storage of data.

Storage

The SC must provide

Non-volatile memory for entity ID and jurisdiction ID

Secure storage for asymmetric keys, e.g., RSA

Secure storage for GK (extendable to license data)

Secure storage for SCAKs

Secure storage for Dongle Request Secrets (such as keys or secret values)

Cryptography

The SC must be able to

Create a private/public key pair. The private key must never leave the SC.

Decrypt data with the private key.

Encrypt data with public keys.

Store external public keys and use them for encryption of data and signature verification.

Creation of digital signatures

Create symmetric session keys (e.g. AES, 3DES,) and return to the host application.

Create random numbers (for key creation).

Provide symmetric algorithms for en/decryption of external data.

Functional Requirements

The SC must be able to

Establish an authenticated and secure communication channel to the MMB.

1.14 Smart Card on a Second Board

If no SC is connected to a second board, all algorithms and key storage mechanisms must be implemented in software. That means that the second board always behaves as if a SC would be connected to it.

In the following, the SC on the second board is referred to as $SC_{SB}$.

1.14.1 Contents of $SC_{SB}$

The $SC_{SB}$ contains

Private/public key pairs for inter-board authentication

Signatures for the public keys. This signature is created with the manufacturer's private keys.

The manufacturer's public keys

If the $SC_{SB}$ is not part of the EGM, the private/public key pair for inter-board authentication and the public key must be integrated in the software of the second board. This ensures that the operation of the MMB is exactly the same regardless of the presence of an $SC_{SB}$ The private/public key, the signatures for the public key, and the public key have the same meanings as on the $SC_{MMB}$.

$SC_{SB}$ is a removable device.

1.14.2 Requirements for $SC_{SB}$

The requirements for $SC_{SB}$ are quite similar to that of $SC_{MMB}$. Though, $SC_{SB}$ does not need to store the GK or license data.

Storage

The SC must provide

Secure storage for asymmetric keys, e.g., RSA

Secure storage for a network certificate

Cryptography

The SC must be able to

Create a private/public key pair. The private key must never leave the SC.

Decrypt data with the private key.

Store external public keys and use them for encryption of data and signature verification.

Create symmetric session keys (e.g. AES, 3DES . . . ) and give it back to the host application.

Create random numbers (for key creation).

Preferred Detailed Specification of Smart Card Generation 1.15 Smart Card Generation The creation of an SC can be separated into three different phases:

Physical generation of the card

Software upload

Personalization

The physical generation of the card is done by the card manufacturer.

The operating system and the application software are loaded onto the SC. Depending on the type of card this upload is performed by the SC manufacturer or the gaming machine manufacturer.

In the personalization phase, all necessary data such as keys, hash values, entity ID etc. are brought onto the card. This phase will take place at the EGM manufacturer's facility. It also includes the generation of unique private/public key pairs on the card and the signing of these public keys. The public keys of the card are then stored together with the cards serial number in the EGM manufacturer's Key Database 1.16 Manufacturer Databases To keep track of the different keys that will be used in the security system, and automate the issuing of SCs, databases need to be created. These databases will merely contain public keys (the public keys of the smart cards), the symmetric GKs, and the serial number or ID of the SC.

1.16.1 Public Keys of MMB Smart Cards

Every SC contains a unique private/public key pair used to identify itself to other smart cards by the EGM manufacturer. In order to do this, the public key of each SC must be signed with the manufacturer's private key. This signature is also stored on the SC.

Furthermore, to keep track of the SCs and to be able to encrypt data (e.g. GK, license, . . . ) for a specific SC, the public key of each SC must be stored together with the serial number of the device in a database controlled by the manufacturer. This is especially important if a licensing system is implemented to be able to create a license for a specific SC.

The generation and the registration of these private/public key pairs are called "Personalization". This personalization process is applied after production of the SC and before the device is shipped to a customer.

1.16.2 Game Keys

It is defined that each game is encrypted with a unique symmetric key for each jurisdiction. Therefore, a database that holds all different Game Keys must be established.

When a new application for a jurisdiction is released, a new GK for this application/jurisdiction is created and stored in the database. The software package for this jurisdiction is encrypted with this new GK.

1.16.3 Game Database

For each game/application different versions of the encrypted software packages for the different jurisdictions should be available. This is due to the fact that each jurisdiction has a unique GK for a game. A database to handle these different software versions needs to be created that contains a connection between version and GK.

1.17 Game Distribution

As a requirement, an application on an EGM is only able to run if the relevant SC is inserted into the EGM. Thus, a distribution mechanism must be applied to deliver the software packages together with the matching SCs.

1.18 Terms

| | |
|---|---|
| Entity | customer, casino, or group of casinos |
| Game Key | symmetric key to decrypt the EGM application |
| Signature | hash value encrypted by a private asymmetric key |
| Signature Verification | the encrypted hash value is decrypted with the public asymmetric key; the result is compared to a newly computed hash value of the signed data. If the hash values are equal the signature is correct. |
| Smart Card Access Key | key to access confidential data or functionality on a smart card |

1.19 Abbreviations

-continued

| | |
|---|---|
| AES | Advanced Encryption Standard |
| DES | Data Encryption Standard |
| EGM | Electronic Gaming Machine |
| GK | Game Key |
| IP | Intellectual Property |
| MMB | Main Microcontroller Board |
| MSD | Mass Storage Device |
| OS | Operating System |
| OSVK | Operating System Verification Key |
| PKI | Public Key Infrastructure |
| ROM | Read Only Memory |
| RSA | Rivest, Shamir, Adleman - public key algorithm |
| SC | Smart Card |
| SCAK | Smart Card Access Key |
| SIBC | Secure Inter Board Communication |
| TCP | Transmission Control Protocol |

1.20 Preferred Detailed Specification of Secure Module on Microcontroller Board

The objective of the section is to specify additional board hardware requirements related to copy protection of sensitive information contained within a microcontroller board on an Electronic Gaming Machine (EGM).

The goal of the concept from the hardware point of view is to protect those elements of the board considered to be of high security risk. The high security risk elements will be fully specified in this section. The area around the security elements is called Secured Area. The Secured Area must be fully enclosed. This includes also the implementation of a number of detection methods to prevent access by unauthorized person to the area. If any access from the outside is detected, all sensitive information on the board is deleted.

It must be guaranteed that no customized BIOS, Smartcard, Operating System (OS) loader, OS Image or Application can be used to obtain sensitive information from the microcontroller board. The sensitive information is considered to be plain text, such as the game application or secret keys, stored in the memory inside the secured area. This sensitive data might contain keys to decrypt the program, which is executed on the board.

The secure module is especially applicable for a smart card software protection system described above.

A set of definitions is made for a better understanding of the overall security concept.

1.21 General Definitions

This section describes general terms referring to the security concept.

1.21.1 Microcontroller Board

Figure 11:
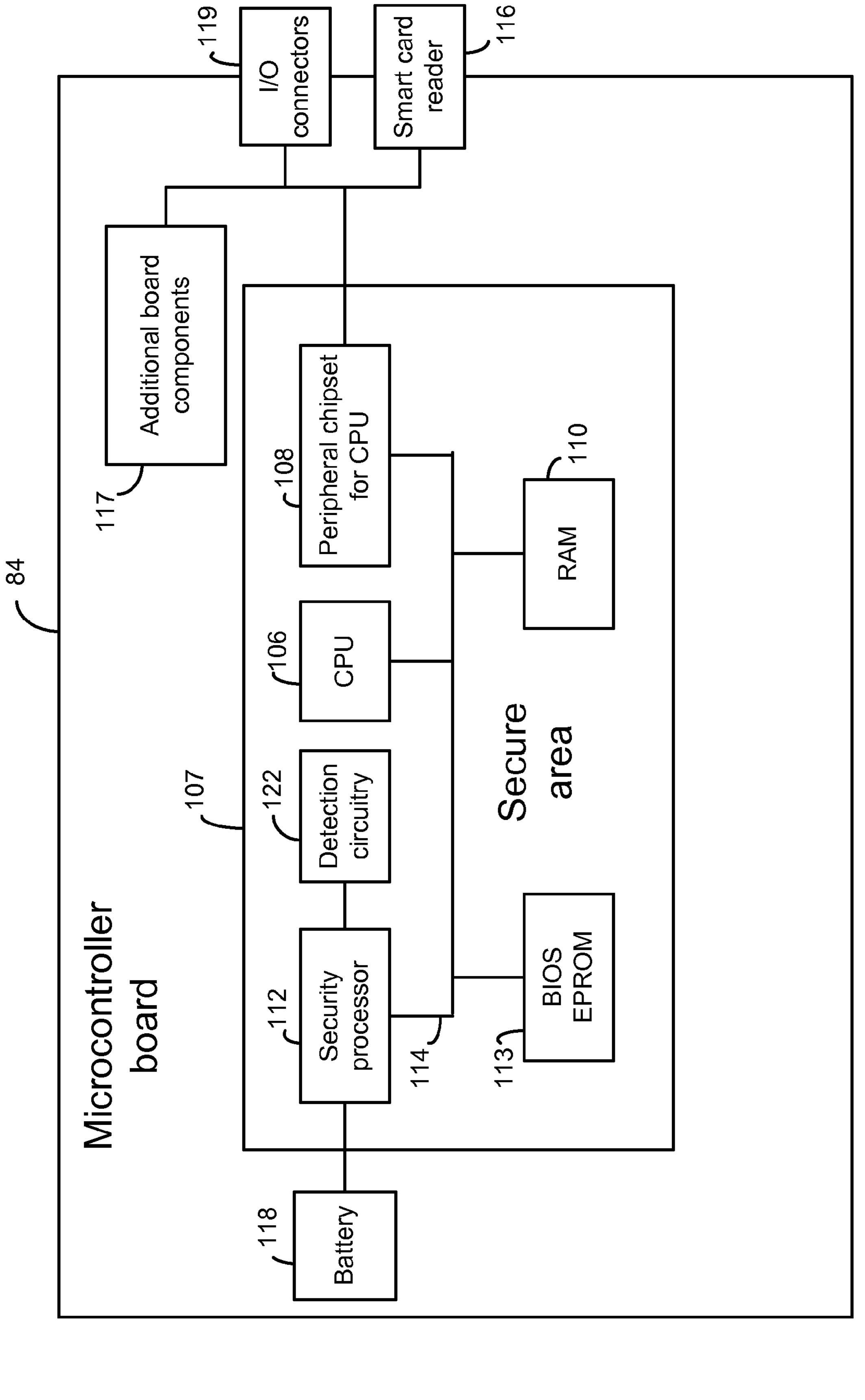
FIG. 11 illustrates the basic functional units of a secure microcontroller board in a gaming machine that prevents copying of the game software and prevents the external reading of any secure data.

As shown in FIG. 11, the Microcontroller Board 84 has a Secure Area (SA) 107 containing at least a main processor (CPU) 106 and its chipset 108, main memory (RAM) 110, a Security Processor (SP) 112, and BIOS EPROM 113. These components are connected via a BUS system 114. A smart card reader 116 is attached to the board and may be in its own secure area to prevent someone from easily gaining access to the smart card and data lines. Non-sensitive components, shown as block 117 and battery 118, may be outside the SA 107.

1.21.2 Secure Area

The Secure Area (SA) 107 protects all sensitive components and data lines on the board. It has a series of sensors that detects any kind of intrusion. If such an intrusion by an attacker is detected, the Security Processor (SP) resets the CPU, deletes sensitive data in the secured area.

1.21.3 Security Processor

The Security Processor (SP) 112 surveys all sensors of the secure area. These sensors are a meander system, light sensors, and temperature sensors. If an intrusion is detected, it deletes all sensitive data on the board.

1.21.4 Sensitive Data

Sensitive data are protected against any change from the outside or from even being read from the outside. This can be decrypted application data and secret keys. The sensitive data are stored in the memory inside the secured area.

This section gives a conceptual overview of the security mechanisms on the microcontroller board 84.

It is assumed that the game application that will be executed on the board 84 is stored on an external device (e.g., a CD ROM and drive, compact flash memory, server, etc.) only in encrypted form. The decrypted and thus executable application is only available inside the secure area 107.

Only applications encrypted with the correct key(s) are allowed to be loaded onto the board 84. The decryption is either done by the sensitive data stored inside the secure area or with the help of a smart card. After a successful authentication and decryption, the application can be executed. This has also the effect that no software of an unauthorized party, which is not encrypted with the correct key(s), can be executed on the board 84.

The SA's only connection to the outside are the Input/Output (I/O) connectors 119. Via the I/O connectors 119, a mass storage device (FIG. 7) and other I/O devices are connected to the board 84 (e.g., input devices, display devices, network connection, etc.). The smart card reader 116, which allows the smart card to be easily inserted and removed, enables the system to be more flexible in the context of secret key handling and key exchange. In other embodiments, the smart card is hard-wired-connected to the board 84.

All critical components that hold or transfer sensitive data are placed within the SA 107. These are devices such as CPU 106, RAM 110, CPU chipset 108, SP 112, and BIOS EPROM 113. Also all data and address busses are within the SA 107.

Also all sensors, which are the light and the temperature sensors, are inside the SA 107 and thus cannot be modified from the outside.

The task of the SP 112 is the surveillance of the detection circuitry 122 (e.g., the light, wiring, and temperature sensors). When any of the sensors detects an intrusion, the SP 112 deletes the sensitive data inside the secure area.

The BIOS EPROM 113 is also inside the SA 112. Otherwise it would be possible for an attacker to replace the BIOS by a harmful one and hand over sensitive data to the outside (via the I/O connectors 119), or to run unauthenticated software on the board.

1.22 Definition of the Secure Area

The secure area 107 is a three-dimensional-volume which has a meander trace system on all sides, a light sensor system, and a temperature sensor system as detection methods for any possible intrusion. It contains all sensitive components of the board. Unencrypted software on the board is only allowed to be within this SA 107.

Tapping into critical signal lines and component pins, downloading or modifying content of any of the memory, or taking control over any of the secured components must be detected.

If such an intrusion by an attacker is detected, the SP 112 resets the CPU 106, deletes the sensitive data in the secure area. Thus, the attacker has no access to the sensitive data stored on the board.

For simplicity only one secure area is described herein, but more than one secure area may be on the board. All the connections and data lines between the SAs must also be protected.

1.23 Detection Circuitry

The detection circuitry 122 must monitor connectivity and other parameters of the security system to determine if there was an attempt of unauthorized access to the secure area 107. Its core part is the Security Processor (SP) 112.

The SP 112 operates the detection circuitry 122 and surveys all the sensors that are integrated into the secure area 107. If any of the sensors detects an intrusion, the SP 112 activates the deletion phase of the SA 107 and thus deletes the sensitive data.

In the deletion phase, two different tasks are computed by the SP 112. The first task is to reset the CPU 106. The second task of the SP 112 is the deletion of the sensitive data stored in the secure area.

The battery 118 supplies the SP 112 with power when the EGM is switched off. It may be placed inside or outside the SA 107.

1.24 Sensors in the Secure Area

At least three different detection sensors are integrated into the secure area 107. They act independently of each other but are all surveyed by the SP 112.

Meander system on all sides

Light sensors

Temperature sensor 1.24.1 Meander System—The Cover for the Secure Area

A meander trace system creates the cover of the secure area 107. The cover creates the SA 107 around the Secured Elements. The meander trace is measured for continuity by the detection circuit (FIG. 11). The secure area cover cannot be breached without breaking the meander trace and opening up the meander trace circuit.

Unauthorized access to the secured elements within the area is detected. The SA 107 must be fully enclosed by the meander system. That means that all sides of the SA 107 are bordered by meander traces.

Figure 12:
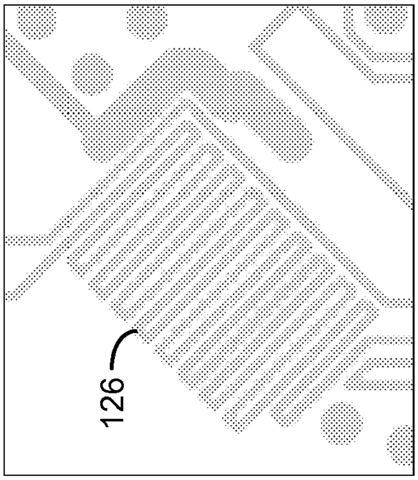
FIG. 12 illustrates an example of a metal meander trace that runs over a secure cover overlying the secure area on the controller board, whereby cutting the delicate trace to gain access to the secure area breaks a circuit and causes the secure memories to be erased.

A meander trace 126, shown in FIG. 12, is created with one trace with minimal width (e.g., 0.2 mm max width) and minimal pitch. Trace 126 fills the protected area in a serpentine pattern. Any Printed Circuit Board (PCB) used must be built in a way to minimize the risk of a false alarm of the light sensors.

Figure 13:
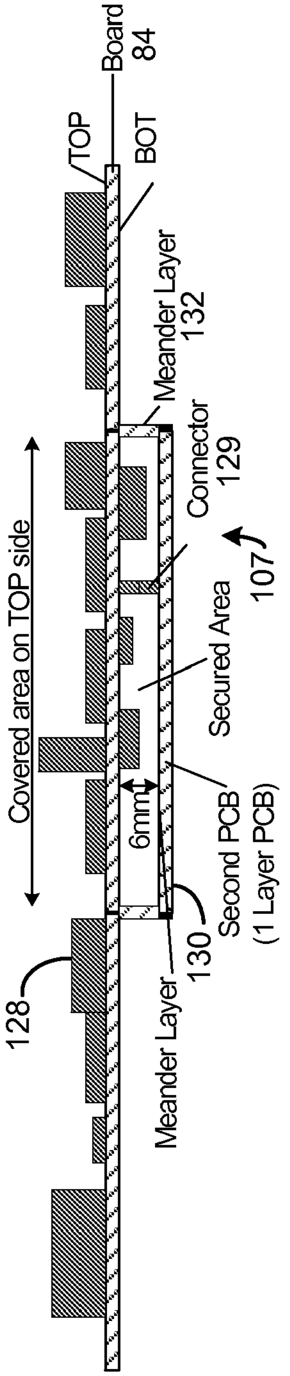
FIG. 13 is a side view of the controller board showing the secure area being covered by a secure cover.

FIG. 13 depicts the general approach to protecting the secure area(s) and should be considered as an example. The blocks 128 represent integrated circuit packages. An electrical connector 129 connects the meander trace to detection circuitry 122.

Protecting the secured elements by a meander system can be done in different ways. Possible solutions providing additional security levels are described below:

1. Use a cover consisting of a PCB 130 with a meander layer 132, including side protection.

2. Flexprint inside the covered area with a cutout for the BIOS and the connector (including side protection).

3. Use an off-the-shelf cover solution, e.g., GORE solution.

1.24.1.1 Security Cover

SIZE The security cover size will be defined during the layout phase of the microcontroller board. The smallest possible size should be achieved.

MATERIAL The material used must prevent fault triggering of the light sensors.

1.24.1.2 Mounting of the Cover

A mounting bracket is needed for the mechanical assembly of the cover and to prevent-false triggering of the light sensors. The cover is mountable when the microcontroller board is assembled.

1.24.1.3 Programming and Enabling of the SP

The final programming of the SP 112 is done at assembly time. That means that the SP is blank after production. Before the cover is assembled, the application is put onto the SP via a programming mechanism. When the cover is closed, the SP starts surveying the detection circuitry 122 after a defined time period (which can be in the range of 10 to 20 seconds). After this time period the sensitive data are deleted when the cover is re-opened.

1.24.2 Light Sensors

The light sensors are in the secure area 107 to detect an intrusion if one or all of the other sensors fail.

1.24.3 Temperature Sensors

The temperature within the secure area 107 must not exceed the temperature defined by the security system. These temperature limits are defined to assure that the detection system works properly.

1.25 Secured Elements

All elements that are within the secure area are referred to as "secured elements". A secured element may be a component, a test point or a signal. Connection to a pin, via, or trace of any of the secured elements from the outside of the secured area must be detected.

The following components are considered to be secured elements and must be fully enclosed (all sides):

- BIOS EPROM
- The Security Processor
- All components, test points and signals of the detection circuitry except the battery.
- Chipset of the CPU
- RAM of the board
- CPU
- I/O chips The following critical signals are considered to be Secured Elements and must be fully enclosed:

- CPU signals
  - Reset signal
  - 100% of all data signals to the CPU chipset
  - At least 10% of the rest signals to the CPU chipset
- CPU chipset signals
  - Communication signals to the SP
  - At least 10% of all RAM address signals
  - 100% of all RAM data signals
- RAM signals
  - At least 10% of all RAM address signals
  - 100% of all RAM data signals
- All further bus signals on the microcontroller board All uses of the word "must" when describing a function are for a preferred embodiment only. In less secure systems, most functions and requirements described with respect to the preferred system are optional.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A verification method for software in a gaming device, the gaming device having a host processing system for running a game program for carrying out a game to be played on the gaming device, the method comprising:

a. providing an authorized first circuit entirely housed within the gaming device, the first circuit being a modular secure circuit whereby data stored in the first circuit is protected by security features, the first circuit being in communication with the host processing system, wherein the first circuit is a dongle;

b. carrying out a succession of games played on the gaming device by running a game program by the host processing system;

c. while carrying out the succession of games played on the gaming device, generating a challenge code by the host processing system prior to a next game being performed by the gaming device, the challenge code being for determining if the first circuit is an authorized first circuit;

d. receiving the challenge code by the first circuit;

e. performing a function on the challenge code by the first circuit to generate a response code by the first circuit, the response code being uniquely determined by the function performed on the challenge code, the first circuit being a secure circuit whereby data stored in the first circuit is protected by security features;

f. determining by the host processing system if the response code was a proper response code by comparing the response code generated by the first circuit to the proper response code;

g. if the response code was determined to be a proper response code, then determining that the first circuit is an authorized first circuit and carrying out the game program to perform at least the next game, the game program being processed and carried out, after determining that the first circuit is an authorized first circuit, independently of the first circuit, wherein, after it is determined that the first circuit is an authorized first circuit, the game program continues to be executed without further involvement by the first circuit until a next challenge code is transmitted by the host processing system to the first circuit;

h. if the response code was determined to not be a proper response code, then determining that the first circuit is not an authorized first circuit and preventing the game being performed by the gaming machine; and i. repeating the steps b through h at various times while the game program is running to ensure the first circuit is still in communication with the host processing system prior to commencing a game.

2. The method of claim 1 wherein the first circuit is a smart card.

3. The method of claim 1 wherein the response code is an encrypted version of the challenge code.

4. The method of claim 1 wherein the first circuit contains one or more keys for encrypting and decrypting data between the host processing system and the first circuit.

5. The method of claim 1 wherein the first circuit is a smart card, the method further comprising inserting the smart card into a smart card reader inside the gaming machine.

6. The method of claim 1 wherein the first circuit contains cryptographic keys for decrypting the challenge code and encrypting the response code.

7. The method of claim 1 wherein generating the challenge code and generating the response code are performed prior to each game being played.

8. The method of claim 1 wherein generating the challenge code and generating the response code are also performed at start-up of the gaming machine.

9. The method of claim 1 wherein the first circuit contains one or more keys for encrypting and decrypting data between the host processing system and the first circuit, the first circuit also containing a processor for performing a cryptographic function on data generated by the first circuit.

10. The method of claim 1 wherein the response code is obtained by performing a hash function on the challenge code.

11. A method of preventing unauthorized use of gaming software comprising:

providing an authorized first circuit for connection completely internal to a gaming machine, the first circuit being a modular secure circuit whereby data stored in the first circuit is protected by security features, wherein the first circuit is a dongle;

providing gaming software in the gaming machine, run by a host processing system, for carrying out a game played by the gaming machine, the gaming software preventing carrying out of the game unless the authorized first circuit is installed in the gaming machine, the host processing system and the first circuit performing the following method:

a. carrying out a succession of games played on the gaming device by running a game program by the host processing system;

b. while carrying out the succession of games played on the gaming device, generating a challenge code by the host processing system prior to a next game being performed by the gaming machine, the challenge code being for determining if the first circuit is an authorized first circuit;

c. receiving the challenge code by the first circuit;

d. performing a function on the challenge code by the first circuit to generate a response code by the first circuit, the response code being uniquely determined by the function performed on the challenge code;

e. determining by the host processing system if the response code was a proper response code by comparing the response code generated by the first circuit to the proper response code;

f. if the response code was determined to be a proper response code, then determining that the first circuit is an authorized first circuit and carrying out the game program to perform at least the next game, the game program being processed and carried out, after determining that the first circuit is an authorized first circuit, independently of the first circuit;

wherein, after it is determined that the first circuit is an authorized first circuit, the game program continues to be executed without farther involvement by the first circuit until a next challenge code is transmitted by the host processing system to the first circuit;

g. if the response code was determined to not be a proper response code, then determining that the first circuit is not an authorized first circuit and halting the carrying out of the game program;

h. repeating the steps a through g at various times while the game program is running to ensure the first circuit is still in communication with the host processing system prior to commencing a game;

controlling distribution of the authorized first circuit such that a gaming machine running an unauthorized copy of the game program will not be able to carry out the game without an authorized first circuit.

12. The method of claim 11 wherein the first circuit is a smart card.

13. The method of claim 11 wherein the response code is an encrypted version of the challenge code.

14. The method of claim 11 wherein providing a first circuit comprises connecting a smart card internal to the gaming machine, wherein the smart card contains one or more keys and a cryptographic function for encrypting and decrypting data between the host processing system and the smart card.

* * * * *

UNITED STATES PATENT AND TRADEMARK OFFICE

CERTIFICATE OF CORRECTION

PATENT NO. : 7,549,922 B2
APPLICATION NO. : 11/083706
DATED : June 23, 2009
INVENTOR(S) : Grahame M. Falvey et al.

It is certified that error appears in the above-identified patent and that said Letters Patent is hereby corrected as shown below:

Column 24, line 12, Claim 11: Cancel "farther" and substitute --further--.

Signed and Sealed this

Third Day of November, 2009

David J. Kappos

*Director of the United States Patent and Trademark Office*